United States Patent
Lanfant et al.

(10) Patent No.: US 11,135,747 B2
(45) Date of Patent: Oct. 5, 2021

(54) METHOD AND MOULD FOR CREATING AN AERODYNAMIC ELEMENT COMPRISING RIBLETS

(71) Applicant: SAFRAN, Paris (FR)

(72) Inventors: Nicolas Pierre Lanfant, Palaiseau (FR); Emilie Goncalves, Paris (FR)

(73) Assignee: SAFRAN, Paris (FR)

( * ) Notice: Subject to any disclaimer, the term of this patent is extended or adjusted under 35 U.S.C. 154(b) by 249 days.

(21) Appl. No.: 15/773,366

(22) PCT Filed: Nov. 3, 2016

(86) PCT No.: PCT/FR2016/052847
§ 371 (c)(1),
(2) Date: May 3, 2018

(87) PCT Pub. No.: WO2017/077239
PCT Pub. Date: May 11, 2017

(65) Prior Publication Data
US 2018/0319044 A1    Nov. 8, 2018

(30) Foreign Application Priority Data

Nov. 5, 2015 (FR) ..................... 15 60621

(51) Int. Cl.
*B29C 33/42* (2006.01)
*B29C 33/40* (2006.01)
(Continued)

(52) U.S. Cl.
CPC .......... *B29C 33/42* (2013.01); *B29C 33/3885* (2013.01); *B29C 33/405* (2013.01); *B29K 2901/12* (2013.01); *B29L 2031/3076* (2013.01)

(58) Field of Classification Search
None
See application file for complete search history.

(56) References Cited

U.S. PATENT DOCUMENTS 6,090,336 A * 7/2000 Hirmer ............. B29C 45/14196
264/259
2013/0062004 A1    3/2013 Amirehteshami et al.
2014/0374951 A1    12/2014 Piccin

FOREIGN PATENT DOCUMENTS

EP    2 818 292 A1    12/2014
JP    2013193270 A *   9/2013

OTHER PUBLICATIONS

Machine English Translation of JP-2013193270-A. Accessed Oct. 16, 2020. (Year: 2012).*

(Continued)

*Primary Examiner* — Peter L Vajda
*Assistant Examiner* — Adrianna N Konves
(74) *Attorney, Agent, or Firm* — Oblon, McClelland, Maier & Neustadt, L.L.P.

(57) ABSTRACT

A method for making an aerodynamic element, particularly for an aircraft, including an external face and a plurality of parallel ribs and/or grooves formed on the external face, the method including making the element and its ribs and/or its grooves simultaneously with a mold, including a step to supply a film made of a deformable material that includes ribs and/or grooves complementary to the ribs and/or grooves of the element, a step to position the film on a wall of the mold, a step in which the element is molded, a step in which the element is separated from the mold simultaneously with the film, and a step in which the film is separated from the element.

9 Claims, 2 Drawing Sheets

(51) Int. Cl.
*B29C 33/38* (2006.01)
*B29L 31/30* (2006.01)

(56) References Cited

OTHER PUBLICATIONS

International Search Report dated Feb. 3, 2017, in PCT/FR2016/052847 filed Nov. 3, 2016.
French Search Report dated Jun. 24, 2016, in French Application 15 60621 filed Nov. 5, 2015.

* cited by examiner

METHOD AND MOULD FOR CREATING AN AERODYNAMIC ELEMENT COMPRISING RIBLETS

TECHNICAL DOMAIN

The invention relates to a method for manufacturing an aerodynamic element, for example such as a panel for an aircraft wing or a turbomachine vane, that comprises a series of ribs and grooves oriented parallel to the air flow.

The invention more particularly discloses a method of making the ribs/grooves in a single piece with the remaining part of the aerodynamic element.

STATE OF PRIOR ART

In order to improve the aerodynamic performances of an aircraft, it has been proposed to add riblets and/or grooves, for example, on the external face of the wings.

These riblets/grooves, commonly more simply called "riblets" are oriented parallel to the air flow direction and are located on the outside surface of the wing.

The height and the width of the riblets are commonly but non-limitatively equal to a value of the order of 10 to 50 micrometres and they extend longitudinally over a major part of the aerodynamic element.

They have the effect of limiting friction of the fluid at the surface of the aerodynamic element and consequently reducing induced drag. This can improve aerodynamic performances.

According to a first manufacturing method, the riblets are formed on a film that is subsequently placed on the external face of the aerodynamic element, particularly by bonding.

With such a manufacturing method, it is easy to fabricate riblets on a flexible plate that is relatively easy to add onto the aerodynamic element.

However, this manufacturing method implies many steps in the manufacturing process and also increases the final mass of the aerodynamic element, particularly due to the presence of fixing means such as glue layers.

Another method of manufacturing the riblets consists of forming the riblets in the mass of the aerodynamic element.

The aerodynamic element is usually made by moulding, particularly moulding of a composite material, the riblets can thus be formed during this moulding operation.

Document US-A-2013/0062004 describes one example of a method of moulding the element with the riblets in a single piece.

According to this method, one wall of the mould comprises ribs and/or grooves complementary to those forming the riblets. The resin that comes into contact with this wall then includes relief forms making up the riblets.

In order to facilitate removal from the mould, a product commonly called a "gelcoat" is applied on all faces of the mould, including on the face provided with ribs and/or grooves complementary to the riblets to be obtained.

This product layer is usually not uniform, which can affect the final shape of the riblets.

Moreover, the aerodynamic element may have a non-plane shape such that its movement relative to the mould during removal from the mould, is not always locally normal to the surface containing the riblets.

Thus, during the mould removal process, shear forces are applied on the riblets that can cause damage to the ridges of the ribs forming the riblets, consequently affecting the efficiency of the riblets.

Thus, the mould removal operation requires large forces to separate the aerodynamic element from the mould, particularly due to friction forces between the aerodynamic element and the mould.

The purpose of the invention is to disclose a method of manufacturing an aerodynamic element comprising riblets made in a single piece with the element, with which it is possible to be sure that the riblets are not damaged during removal from the mould.

PRESENTATION OF THE INVENTION

The invention discloses a method for the manufacture of an aerodynamic element, particularly for an aircraft, comprising an external face and a plurality of parallel ribs and/or grooves formed on said external face, the method consisting of making said element and its ribs and/or grooves simultaneously by the use of a mould, characterised in that the method comprises a step in which a film made of a deformable material is supplied that comprises ribs and/or grooves complementary to the ribs and/or grooves in said element, a step in which the film is positioned on a wall of the mould, a step in which the element is moulded, a step in which the element is separated from the mould simultaneously with said film, and a step in which the film is separated from the element.

The use of a film that can be detached from the mould protects the ribs and grooves forming the riblets when the element to be produced is removed from the mould and peeling of the element after removal from the mould is a method that prevents damage to the riblets. The use of a film also facilitates removal from the mould since the surface of the mould is smooth and is in contact with another smooth face of the film. Friction is very low compared with prior art in which the rough face of the mould matches the complementary rough face of the aerodynamic element.

Preferably, the step in which the film is separated from the element consists of removing the film from the element by peeling.

Preferably, peeling is done parallel to the principal orientation of the ribs/grooves.

Preferably, peeling is done perpendicular to the principal orientation of the ribs/grooves.

The invention also discloses a mould for implementation of a method according to the invention, to obtain an element comprising an external face and a plurality of parallel ribs and/or grooves formed on said external face, characterised in that one of the walls of the mould associated with the external face of the element is covered by a film comprising an external face that will form said external face of the element, said external face of the film having a series of grooves and ribs complementary to the ribs/grooves of the element.

Preferably, the mould comprises means of connecting the film with said wall of the mould such that the film can be held in position during a step in which the element is moulded and that enables separation of the film from the mould when the element is removed from the mould.

Preferably, the film extends beyond the edges of said wall of the mould.

Preferably, the peripheral parts of the film are squeezed between at least two elements forming the mould to hold the film in position on the wall of the mould.

Preferably, the film is made from polyurethane, thermoplastic (PEEK, PEKK, PET or polyamide), silicone, epoxy, a metal sheet or a paint.

Preferably, the film comprises a face that is in contact with said wall of the mould and in which said face and said wall are both smooth.

BRIEF DESCRIPTION OF THE DRAWINGS

Other characteristics and advantages of the invention will become clear after reading the following detailed description, that will be better understood by referring to the appended figures among which.

DETAILED PRESENTATION OF PARTICULAR EMBODIMENTS

Figure 1:
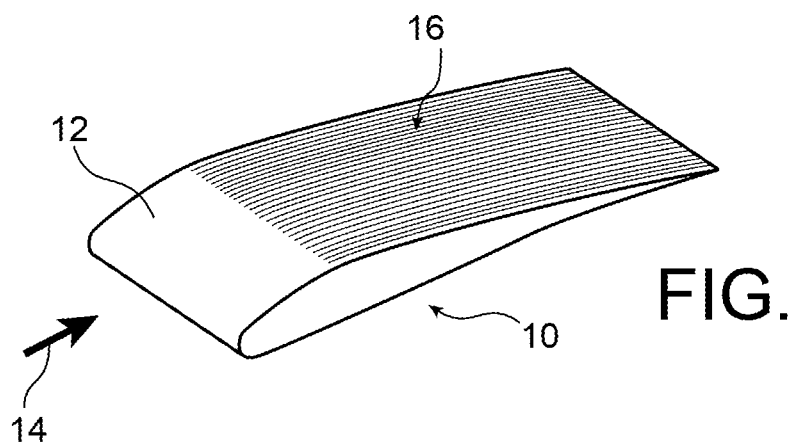
FIG. 1 is a diagrammatic perspective view of an aircraft wing comprising riblets made according to the invention.

FIG. 1 represents an aerodynamic element 10 that in this case consists of a segment of an aircraft wing.

This element 10 comprises an external face 12, in this case the extrados face, on which an air flow circulates longitudinally.

The aerodynamic efficiency of the element 10 is improved by forming riblets 16 on the external face 12 of the element 10.

Figure 2:
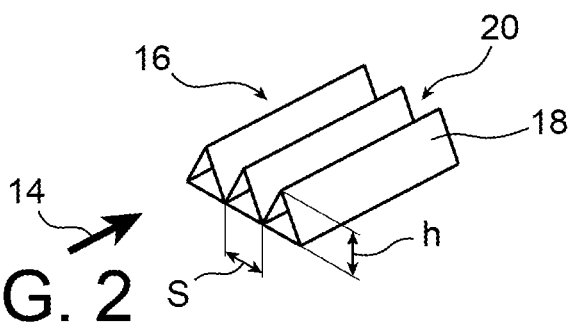
FIG. 2 is a larger scale detail of an example of an embodiment of the riblets.

As can be seen in more detail in FIG. 2, the riblets 16 consist of a sequence of ribs 18 and grooves 20 that are oriented in the longitudinal direction, in other words parallel to the direction of circulation of the air flow 14 on the external face 12.

In this case, the height "h" and the width "s" of the ribs 18 and the grooves 20 are very small, in other words of the order of 10 to 50 micrometres. It will be understood that the invention is not limited to these riblet dimensions that can consequently be larger or smaller.

In this case, the cross-section of the riblets 16 is triangular. It will be understood that the invention is not limited to this shape of riblet, and for example they could non-limitatively be trapezoidal or slots with vertical edges.

The longitudinal length of the riblets is defined as a function of the length of the external face 12 on which the riblets are formed.

The following description will refer to a method for injection moulding of resin into a mould 22 to make the element 10. In this case also, it will be understood that the invention is not limited to such a method of making the element 10. Thus, the element 10 can also be made by any other method that uses a mould 22, for example such as stamping.

Figure 3:
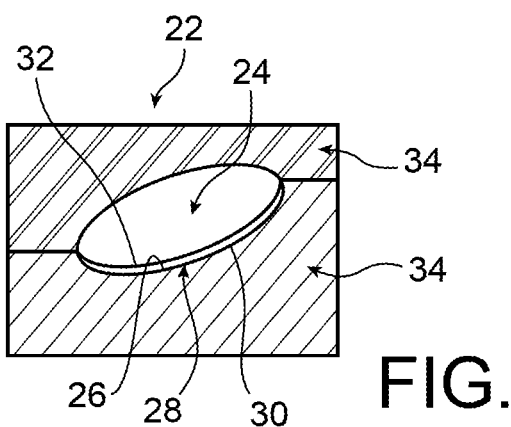
FIG. 3 is a section through a mould comprising a film for use in the method according to the invention.

This mould 22, shown on FIG. 3, delimits a volume 24 that is complementary to the element 10 to be obtained.

The mould 22 comprises a wall 26 that will be used to make riblets 16. This wall 26 is thus located on the face 12 of the element 10 to be obtained, that comprises the riblets 16 to be obtained.

Preferably, this wall 26 of the mould 22 is covered by a flexible film 28 with a smooth face 30 that will come into contact with the wall 26 and an external surface 32 comprising ribs 36 and grooves 38 (shown on FIGS. 5 and 6), from which the ribs 18 and the grooves 20 of the element 10 will be obtained.

Thus, when the mould 22 is fitted with the flexible film 28, it has a surface in relief corresponding to the external face 32 of the film 28, that will be used to produce the riblets 16. The ribs 36 and the grooves 38 of the film 28 are thus complementary to the ribs 18 and the grooves 20 of the element 10.

According to the embodiment shown on FIG. 3, the dimensions of the flexible film 28 are identical to the dimensions of the wall 26 of the mould 22. It will be understood that the invention is not limited to this embodiment and that the flexible film 28 can extend beyond the edges of the wall 26.

The film 28 can then be held in position in the mould 22 during the operation to fabricate the element 10. For example, the mould 22 comprises several components 34 between which the peripheral parts of the film 28 that project from the wall 26 can be squeezed.

The mould 22 is also designed such that the film 28 can easily be separated from the components 34 of the mould 22 after the injection operation.

Figure 4A:
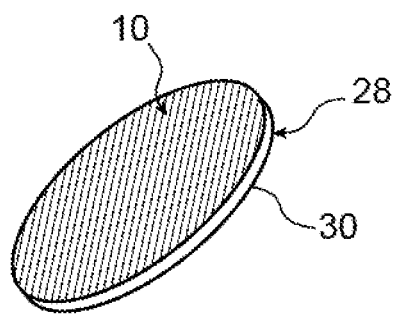
FIGS. 4A and 4B are views of the moulded element with and without the film, obtained after the mould removal operation.

In order to preserve the riblets 16 of the element 10 when removing the element 10 from the mould, the film 28 remains fixed to the element 10, in other words the element 10 and the film 28 are simultaneously taken out of the mould 22 as is shown on FIG. 4A.

The wall 26 of the mould 22 is smooth, as is the face 30 of the film that will come into contact with this wall 26. Thus, when the element 10 is desolidarised from the mould 22, there is no friction at the external face 12 comprising the riblets 16, therefore the risk of damaging the riblets 16 during this operation is low.

Figure 4B:
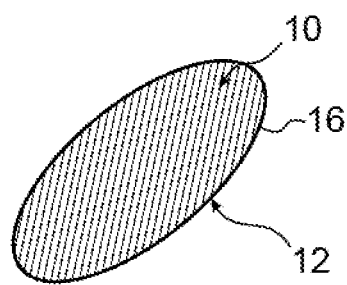
Figure 5:
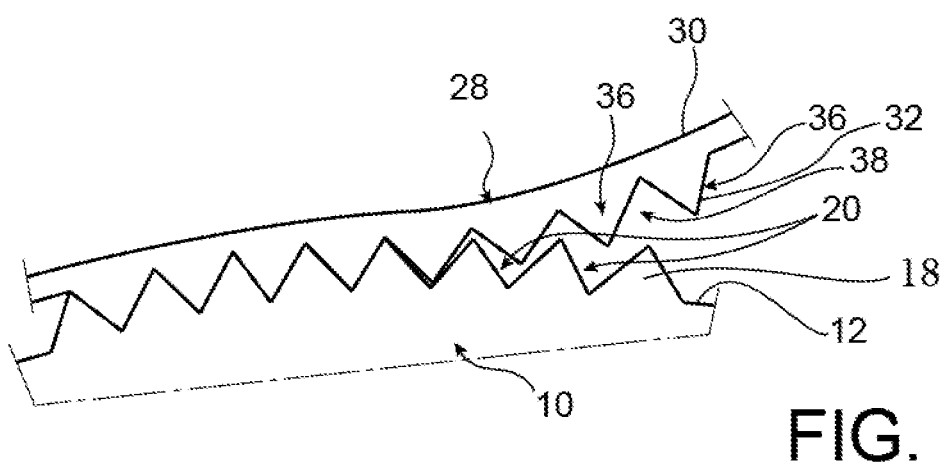
FIG. 5 represents the peeling operation along a direction perpendicular to the riblets.
Figure 6:
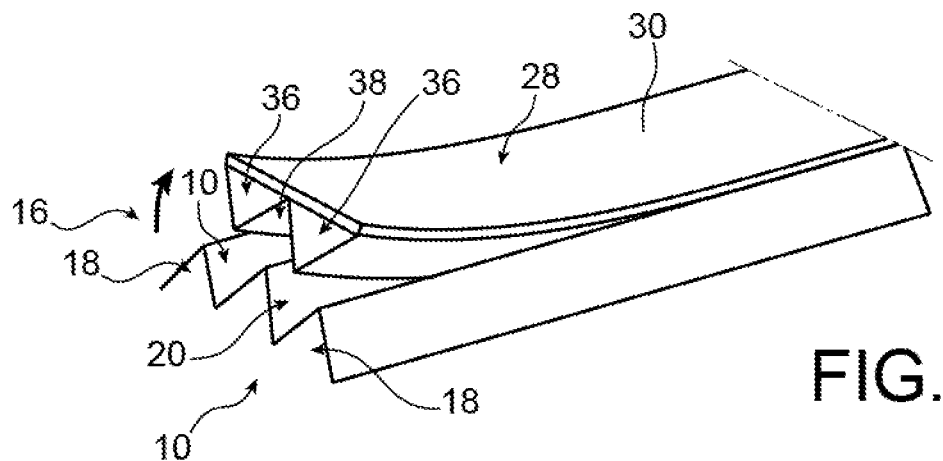
FIG. 6 represents the peeling operation along a direction parallel to the riblets.

The film 28 is then desolidarised from the element 10, as shown on FIGS. 4B, 5 and 6.

The film 28 is made from a flexible material for example from a material such as polyurethane, thermoplastic (PEEK, PEKK, PET or polyamide), silicone or epoxy, so that it can be desolidarised from the element 10.

According to one variant embodiment, the film 28 is a thin metallic film 28. For example, the thickness of the film 28 is 50 µm, it will be understood that this thickness of the film does not take account of the height of the riblets.

According to another variant, the film is a composite element composed of several materials comprising metal tips and a polymer heel. One example of the fabrication of such a film 28 can for example be deduced from document U.S. Pat. No. 8,678,316, that describes a film made of a composite material comprising riblets.

The material from which the film 28 is fabricated is chosen to resist temperature and pressure conditions that occur during moulding, but also so that it can easily be detached from the element 10. Furthermore, desolidarisation is done by peeling the film 28, in other words it is progressively separated from the external face 12, so that this desolidarisation can take place without damaging the riblets and particularly the edges of the ribs 18.

According to the embodiment shown on FIG. 5, peeling is done along a direction perpendicular to the principal direction of the ribs 18 and the grooves 20 forming the riblets 16, in other words along a globally transverse direction.

According to another embodiment shown on FIG. 6, peeling is done along the principal direction of the ribs 18 and the grooves 20 forming the riblets 16, in other words along a globally longitudinal direction.

By peeling of the film 28 to desolidarise the element 10, there is no displacement of the entire film 28 parallel to the top face 12 of the element 10. Thus, no transverse or longitudinal action is applied to the ribs 18 of the riblets 16, thus reducing the risk of breaking the riblets.

The method of making the element 10 with the riblets 16 directly integrated into the element, in other words so that the riblets 16 are made simultaneously with the element 10, includes the following sequence of steps:

supply the mould 22 in which the internal volume 24 will supply the element 10;

supply a film 28, one face 32 of which comprises ribs 36 and/or grooves 38 complementary to the ribs 18 and/or grooves 20 of the riblets 16 to be obtained;

put the film 28 on a wall of the mould 22 partly delimiting the internal volume 24 of the mould. The remaining volume is then complementary to the element 10 to be obtained with the riblets 16;

perform the moulding operation of the element 10, for example by injection and then baking of a resin;

remove the element 10 and the film 28 from the mould simultaneously, in other words the element 10 and the film 28 remain attached to each other as shown on FIG. 4A;

desolidarise the film 28 from the element 10 to expose the riblets 16.

The film 28 is made using any method capable of forming grooves 38 and ribs 36 complementary to the riblets 16 to be obtained. For example, by moulding from a master mould or by etching the film.

The invention claimed is:

1. A method for making an aerodynamic element comprising an external face on which an air flow circulates longitudinally and a top face and a plurality of parallel ribs and grooves formed on said external face, the method comprising:

supplying a film made of a deformable material that comprises ribs and grooves complementary to the ribs and grooves of said aerodynamic element, the film including a smooth face, and an external surface comprising the ribs and grooves, positioning the film on a wall of a mold such that only the film is in the mold and the smooth face of the film abuts the wall of the mold, the mold delimiting a volume that is complementary to the aerodynamic element, and the wall of the mold on which the film is positioned being smooth and corresponding to the external face of the aerodynamic element, molding the aerodynamic element with the mold so as to make the aerodynamic element and the ribs and grooves on the external face of the aerodynamic element simultaneously, separating the aerodynamic element from the mold simultaneously with said film, and separating the film from the external face of the aerodynamic element such that there is no displacement of the film parallel to the top face of the aerodynamic element and no transverse or longitudinal action is applied to the ribs of the aerodynamic element.

2. The method according to claim 1, wherein separating the film from the aerodynamic element includes removing the film from the aerodynamic element by peeling.

3. The method according to claim 2, wherein said peeling is done parallel to a principal orientation of the ribs and grooves.

4. The method according to claim 2, wherein said peeling is done perpendicular to a principal orientation of the ribs and grooves.

5. A mold for implementing a method according to claim 1, to obtain an aerodynamic element comprising an external face and a plurality of parallel ribs and grooves formed on said external face, wherein one of the walls of the mold is covered by a film comprising a series of grooves and ribs complementary to the ribs and grooves of the aerodynamic element.

6. The mold according to claim 5, wherein the mold comprises means of connecting the film with said wall of the mold such that the film can be held in position during a step wherein the aerodynamic element is molded and that enables separation of the film from the mold when the aerodynamic element is removed from the mold.

7. The mold according to claim 6, wherein the film extends beyond edges of said wall of the mold.

8. The mold according to claim 7, wherein peripheral parts of the film are squeezed between at least two elements forming the mold to hold the film in position on the wall of the mold.

9. The mold according to claim 5, wherein the film is made from polyurethane, thermoplastic (PEEK, PEKK, PET or polyamide), silicone, epoxy, a metal sheet or a paint.

* * * * *